(12) United States Patent
Bekmambetov et al.

(10) Patent No.: US 9,129,448 B2
(45) Date of Patent: Sep. 8, 2015

(54) VISUALIZATION OF A NATURAL LANGUAGE TEXT

(76) Inventors: Timur Nuruahitovich Bekmambetov, Moscow (RU); Sergey Vladimirovich Kuzmin, Moscow (RU); Anton Alekseevich Novoselov, Moscow (RU)

(*) Notice: Subject to any disclaimer, the term of this patent is extended or adjusted under 35 U.S.C. 154(b) by 0 days.

(21) Appl. No.: 13/497,613

(22) PCT Filed: Aug. 31, 2011

(86) PCT No.: PCT/RU2011/000666
§ 371 (c)(1),
(2), (4) Date: Mar. 22, 2012

(87) PCT Pub. No.: WO2013/032354
PCT Pub. Date: Mar. 7, 2013

(65) Prior Publication Data
US 2014/0160134 A1    Jun. 12, 2014

(51) Int. Cl.
*G06T 13/80* (2011.01)
*G06F 17/28* (2006.01)
*G06T 11/20* (2006.01)
*G06F 17/27* (2006.01)

(52) U.S. Cl.
CPC ............ *G06T 13/80* (2013.01); *G06F 17/2785* (2013.01); *G06F 17/28* (2013.01); *G06T 11/206* (2013.01)

(58) Field of Classification Search
USPC .............. 345/473, 419, 420; 704/9, 276, 257, 704/260, 270
See application file for complete search history.

(56) References Cited

U.S. PATENT DOCUMENTS

| | | | | |
|---|---|---|---|---|
| 7,373,292 | B1* | 5/2008 | Coyne et al. | 704/9 |
| 7,512,537 | B2* | 3/2009 | Pahud et al. | 704/272 |
| 7,599,838 | B2* | 10/2009 | Gong et al. | 704/258 |
| 7,973,793 | B2* | 7/2011 | Yasugi et al. | 345/473 |
| 2002/0024519 | A1* | 2/2002 | Park | 345/474 |
| 2007/0146360 | A1* | 6/2007 | Clatworthy et al. | 345/419 |
| 2008/0126939 | A1* | 5/2008 | Chung et al. | 715/723 |
| 2009/0058860 | A1* | 3/2009 | Fong et al. | 345/467 |
| 2011/0040555 | A1* | 2/2011 | Wegner et al. | 704/9 |
| 2012/0072280 | A1* | 3/2012 | Lin | 705/14.45 |

OTHER PUBLICATIONS

Aravind K. Joshi & B. Srinivas, Disambiguation of Super Part of Speech (COLLIN '94), Apr. 1995, University of Pennsylvania.*
Jan Wolter, A Guide to Web Authentication Alternatives, Oct. 2003.*

* cited by examiner

Primary Examiner — Maurice L McDowell, Jr.
(74) Attorney, Agent, or Firm — Alexander Rabinovich

(57) ABSTRACT

This invention is related to visualization of a natural language text, namely, to conversion of such text into a corresponding image, animation, or a three-dimensional scene. The proposed solution provides for a tool set for visualization of such text and automatically obtaining an animated three-dimensional scene. The invention contemplates a method of text visualization comprising the steps of obtaining a natural language text, conducting an automatic semantic breakdown of the language text (parsing) with the purpose of obtaining a structured semantic net, creating a three-dimensional scene on the basis of semantic breakdown results, creating a video clip or a set of pictures using the obtained three-dimensional scenes, and visualization of the obtained video clip or set of images. The invention provides for simultaneous producing video clips by several users according to different scenarios, manual editing a three-dimensional scene and semantic breakdown results, replenishing a library by own content, etc.

17 Claims, 3 Drawing Sheets

VISUALIZATION OF A NATURAL LANGUAGE TEXT

CROSS-REFERENCE TO RELATED APPLICATIONS

This application is a U.S. national stage application of a PCT application PCT/RU2011/000666 filed on 31 Aug. 2011, whose disclosure is incorporated herein in its entirety by reference.

FIELD OF THE INVENTION

This invention is related to visualization of a natural language text, namely, to conversion of a natural language text into an image, animation or a three-dimensional scene corresponding to this text.

BACKGROUND OF THE INVENTION

There exist computer software products, which make it possible to decompose a text, build up semantic nets on its basis and this allows the objects, subjects, practices, conceptual hierarchy, execution sequence, qualitative, quantitative and timing performances to be determined out of the text. There exist products, which make it possible to build up manually a three-dimensional scene adding the models of characters, objects, models of buildings, to arrange cameras and add light sources, to animate a scene and finally obtain a three-dimensional animation video clip or static pictures. However, there are no scalable distributed systems, which would make it possible to automatically obtain a three-dimensional video clip or picture on the basis of a natural language text.

BRIEF SUMMARY OF THE INVENTION

The problem to be solved by this invention is visualization of a natural language text in the form of a three-dimensional animated video clip or a set of pictures, and provision for a simplicity of obtaining a text audio-visual pre-visualization. Hence, a key moment of the invention is precisely a text visualization: there is provided a text at the input, whereas a picture or video clip is produced at the output.

A technical result that may be achieved when implementing the claimed method is obtaining a set of tools for visualization of a natural language text and automatically obtaining an animated three-dimensional scene. An additional technical result may be that of obtaining a full-fledged deposit library of accessories (models, animation, sound, texture and so on) for comparatively precise visualization of natural language texts.

To solve the aforementioned problem, there is proposed a method of text visualization including the steps of:
- obtaining of a natural language text;
- conducting an automatic semantic breakdown of submitted natural language text with the purpose of obtaining a structured semantic net for subsequent generation of a three-dimensional scene on its basis;
- creation of a three-dimensional scene on the basis of semantic breakdown results with the use of a built-in library of accessories;
- creation of a video clip or a set of pictures using the three-dimensional scenes; and
- visualization of the obtained video clip or a set of pictures.

One more aspect of the claimed invention concerns the fact that a sound accompaniment is added when creating a video clip.

In one more aspect of the claimed invention, the text semantic breakdown comprises:
- splitting the text into sentences;
- numbering of words within the framework of a sentence;
- selection of objects, subjects, practices and properties;
- classification of all the words with the help of tree of notions, which makes it possible to narrow down synonyms to general notions; and
- unambiguous identification of objects within the framework of the whole text.

In one more aspect of the claimed invention, a user is given a possibility of manual editing of obtained three-dimensional scene.

In one more aspect of the claimed invention, a user is given a possibility of manual editing of the results of automatic semantic breakdown.

In one more aspect of the claimed invention, a user is given a possibility of semantic breakdown performed manually.

Besides, the aforementioned problem is solved by designing a text visualization system comprising:
- a Web-service that processes user's requests for visualization of a natural language text;
- a semantic breakdown service that receives a structured semantic net from the text;
- a database;
- a scene compiler service that uses the semantic breakdown results and database for building up a ready three-dimensional scene;
- a rendering service that ensures generation of a video clip or a set of pictures using the obtained three-dimensional scenes; and
- a user's apparatus that visualizes a ready video clip or s set of pictures.

In one more aspect of the claimed invention, a Web-service is provided so that it has a possibility of taking into consideration the statistics of requests, accumulating the data concerning the frequency, timing and resource indices computed during transition from text to animation as well as maintaining accounts for its own operation in the form of a log.

In one more aspect of the claimed invention, the Web-service is provided so that it has a possibility of user's authentication.

In one more aspect of the claimed invention, the text visualization system contains several Web-services located on both one and several machines.

In one more aspect of the claimed invention, the text visualization system additionally contains a sound processor service, which generates dialogs, prepares sets of sounds produced during animation of a scene and prepares a background track.

In one more aspect of the claimed invention, the sound processor service is combined with a rendering service and scenes compiler service.

In one more aspect of the claimed invention, the text visualization system additionally contains a balancing component, which estimates the existing resources of subsystems and loads them distributing the load.

In one more aspect of the claimed invention, the balancing component manages a sequential data processing by a semantic breakdown service, scenes compiler service, sound processor service and rendering service.

In one more aspect of the claimed invention, the rendering service is made so that it has a possibility of adding the sound and compacting the obtained dubbed video clip.

BRIEF DESCRIPTION OF THE DRAWINGS

FIGURE attached hereto essentially illustrates a structural scheme of the inventive solution.

DETAIL DESCRIPTION OF PREFERRED EMBODIMENTS OF THE INVENTION

Figure 1A:
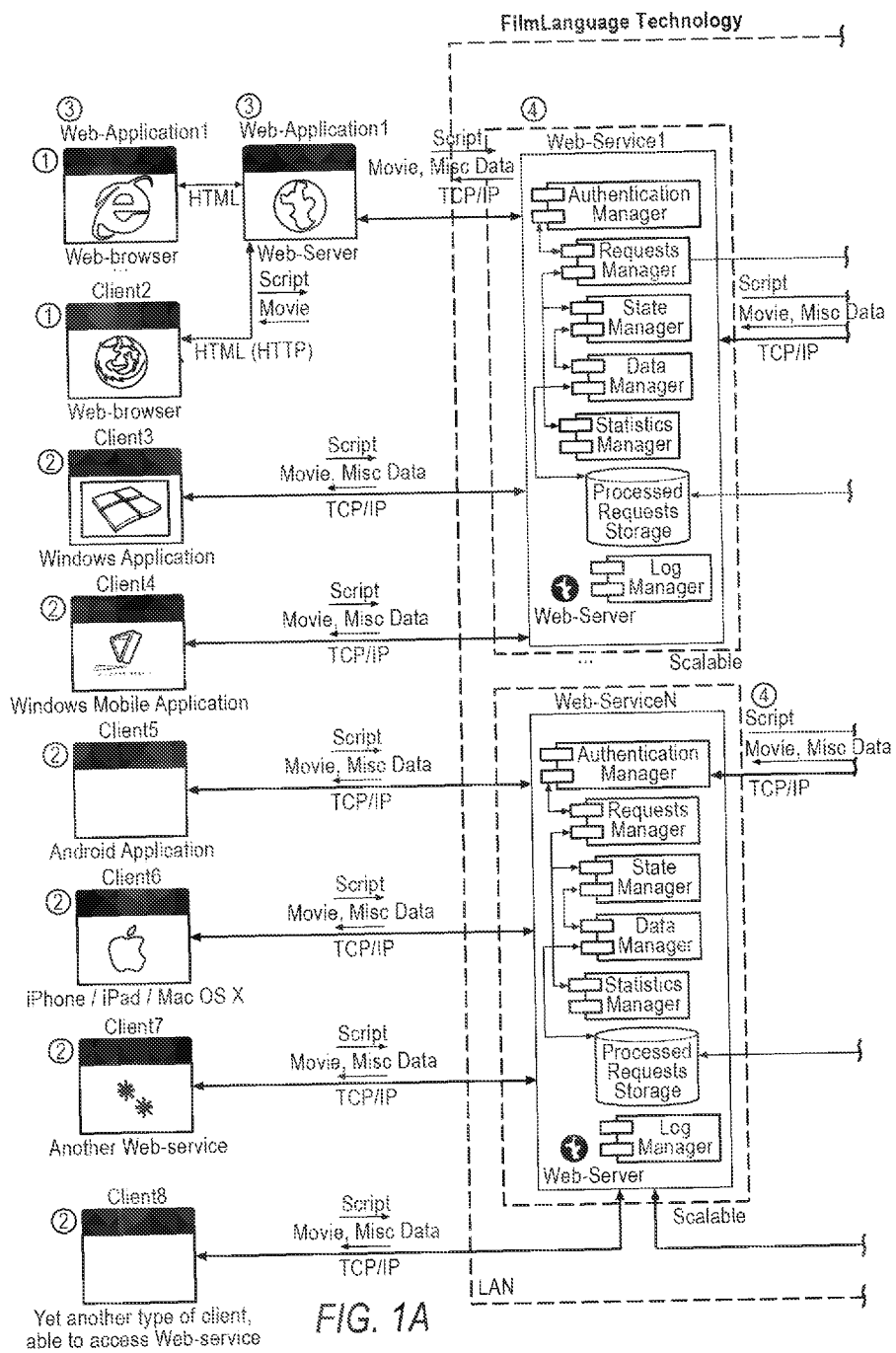
Figure 1B:
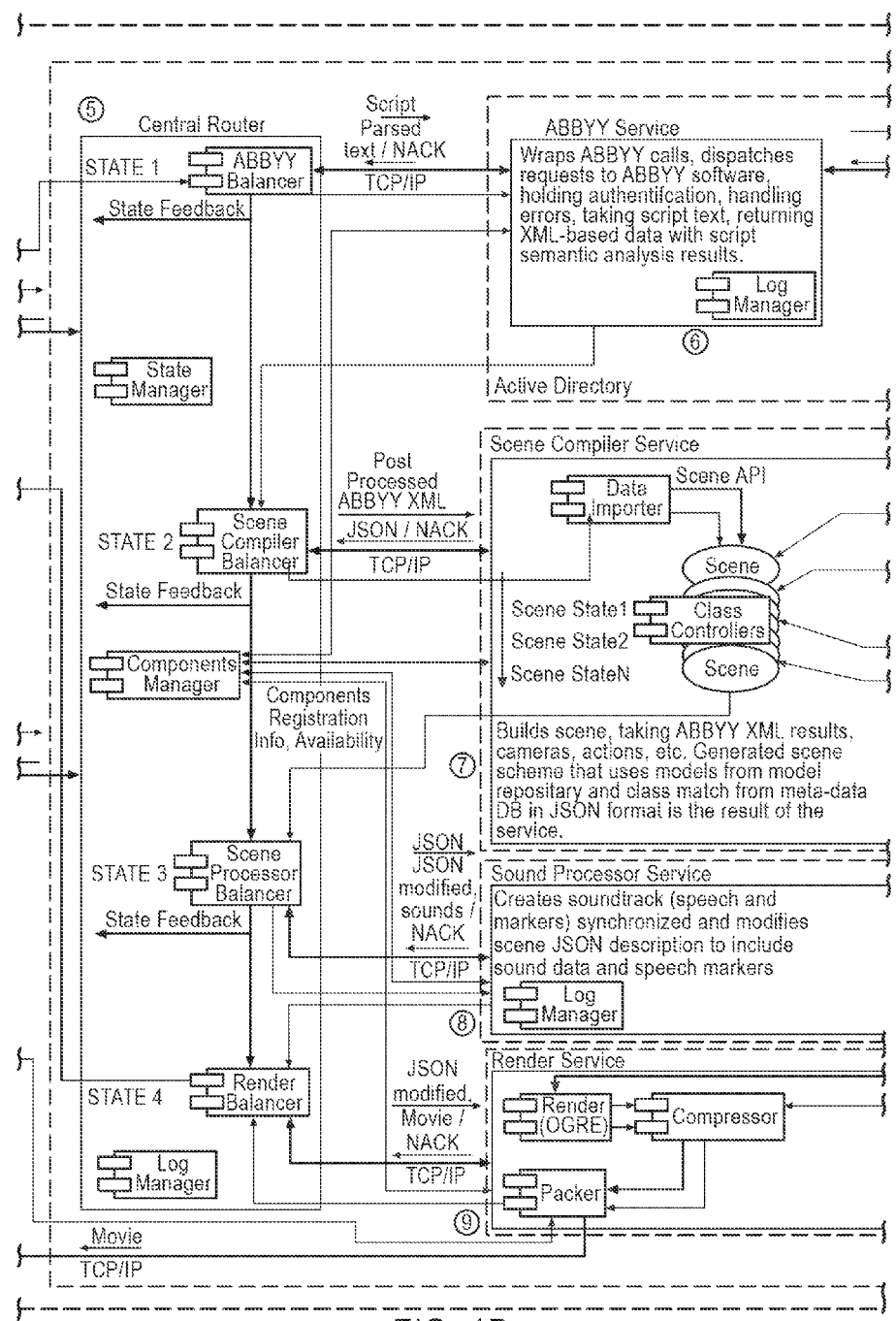
Figure 1C:
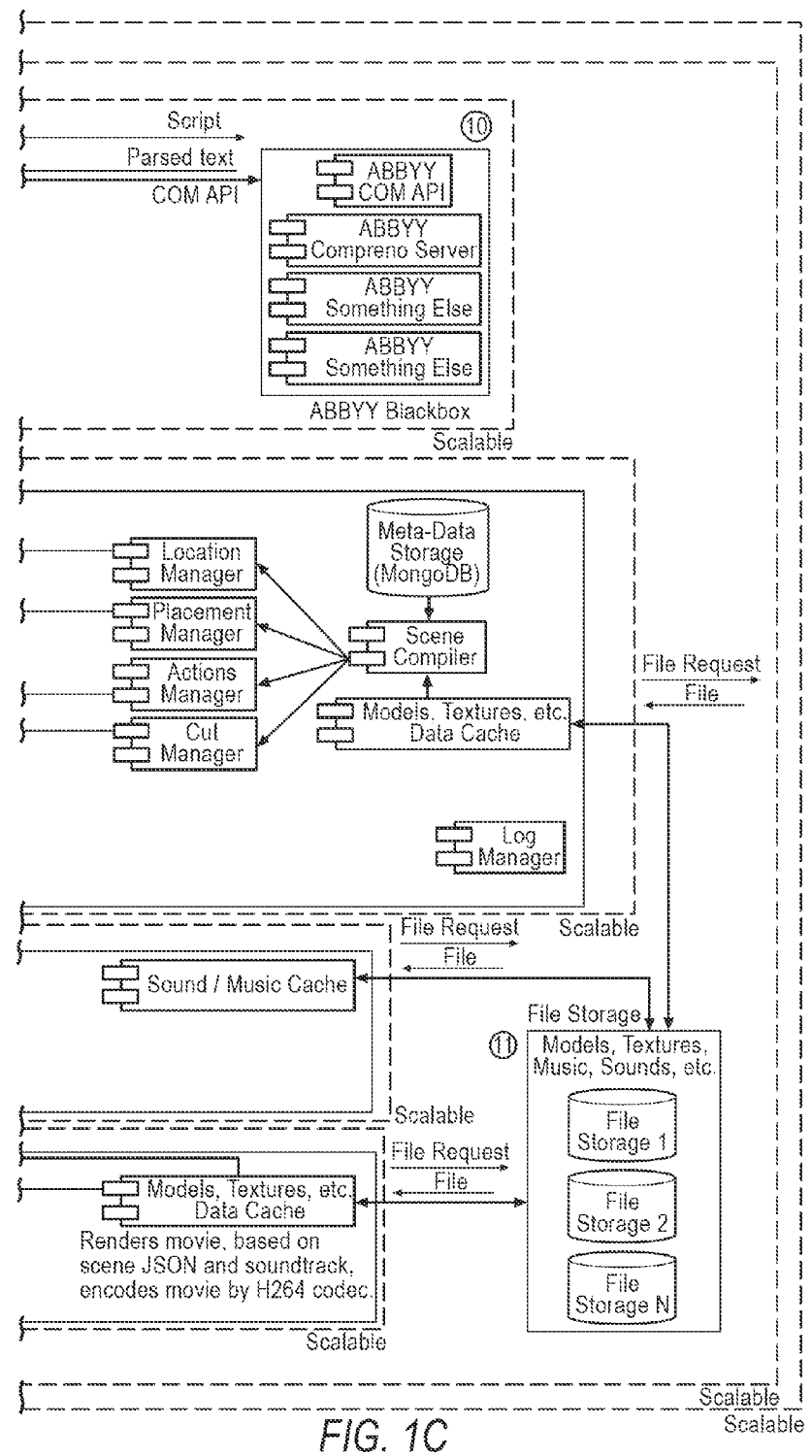

Hereinafter, the invention will be described in detail with references given to the attached drawing.

The inventive solution contemplates several comparatively independent components. The solution may be used for visualization of the text necessary for a full-fledged operation of various computer applications and systems (1), including web applications (3) operating under control of various Web servers and accessible for users through browsers, desktop (window) GUI applications (2) developed for various computer operating systems, applications for mobile platforms (Windows Mobile, Symbian, Android, Apple and so on), various services including Web-services and so forth.

To ensure access to the technology, a special Web-service (4) is employed, being an independent application that implements an interaction according to the TCP/IP protocol (some alternatives are possible). The application makes it possible to control over requests the text animation, requests status, receiving and storage of obtained video file. The Web-service makes it possible to take into consideration the statistics of requests, to accumulate the data concerning the frequency, timing and resource indices computed during transition from text to animation as well as to maintain accounts for its own operation in the form of a log. The Web-service also maintains authentication. The authentication mechanism is not principal (certificates, digital signature, log-in/password, operational system authentication and so on). The Web-service may be implemented, for instance, in the C++ computer programming language. The Web-service is scalable. It means that several Web-services located on both one and several computers may exist for servicing the user's requests. From the point of view of technology, the use of Web-service is not principal: it serves as an "entry point" only, ensuring access to the technology.

The Web-service(s) redirect(s) the users' requests for obtaining the text animations to the special balancing component (Central Router, 5). This component is responsible for the process of obtaining the animation video clip over the scene text. It estimates the existing resources of the "operating" components and loads them while distributing the load, returns the video clip receiving status to the Web-service and transmits the data from one component to another. The balancing component may be realized in C++. It interacts with the Web-service according to the TCP/IP protocol and with the remaining components, according to the TCP protocol. From the point of view of technology, availability of the balancing component is principal for ensuring execution sequence and data transmission when creating a video clip, only, since in the simplest case, each of the "operating" components is realized in a single copy.

The balancing component organizes a sequential data processing by the semantic breakdown service (6), scene compiler service (7), sound processor service (8) and rendering service (9). The balancing component is responsible for transmission of all the data (it passes through itself all the data) used in the process of obtaining the video clip, except for the resultant video clip (due to a large volume).

The semantic breakdown service (ABBYY Service) makes it possible to obtain the semantic breakdown results over the video clip scenario text. Used as a semantic breakdown technology is the ABBYY Compreno, which requires for its operation the support of the Windows Active Directory service. The ABBYY Compreno (10) components submit the COM-interfaces for obtaining the text breakdown results in the XML format. The use of the ABBYY Compreno is optional. Likewise, another technology producing the following information (that may be converted into the like XML-format) will suit the case, namely:

Text splitting into sentences;
Numbering of words within the framework of a sentence;
Selection of objects, subjects, practices and properties;
Classification of words with the help of the tree of notions, which makes it possible to narrow down synonyms to general notions, including the information concerning several levels notions;
Unambiguous identification of objects within the framework of the whole text;
Morphological information;
Information on the relationship between words (the relationship between adjectives and nouns, relationship between linked objects represented by complements); and
Breakdown of numeral adjectives.

In the simplest case, the semantic breakdown service is realized in a single copy, however, to ensure a scalability, there may be also supported several similar services performing the analysis of different pieces of a text at a time.

The scene compiler service uses the results of semantic breakdown, storage of models, textures and meta database for building up the ready animated scene (without sound). Thereat, the service produces a scene description in the special JSON-format containing references to real models of files. The class hierarchy obtained as a result of semantic breakdown is converted into real models and their final animations in time.

The sound processor service generates dialogs, prepares sets of sounds produced in the process of a scene animation as well as a background track. This service also changes a scene description specifying a synchronization with a sound. Selection of a separate component for sound processing is not principal since potentially, this component may be combined with the rendering and scene compiler components.

The rendering service ensures generation of a video clip (rendering), sound superimposition and compaction of obtained dubbed video clip. Used as a renderer visualization means is three-dimensional scroll box OGRE3D. The obtained video clip with audio track is compacted with the use of standard coder/decoder H264.

Models, textures, sounds, music, animation and so on are located in the filed data bank (11). An access to this bank is effected from the scene compiler service for calculating the scene animations, from the sound processor service for superimposing various sounds and from the rendering service for final rendering and linking a video clip.

The renderer, scene compiler and sound processor components may be combined. Thereat, at the expense of using independent data formats in realization of the scene compiler, a semantically broken down scene may be edited in the so-called scenario editor where the scenario text splitting, scene layout, selection of models corresponding to the objects, execution sequence and location may be changed.

The compiled scene may be also refined. For the purpose, there may be developed a scene editor, which makes it possible to change a scene at the level of animations, keys of properties, special effects, position of cameras, editing, the long and the short of it, a simplified 3-D editor with severely restricted and automated functionality of the clusters, type Adobe Premiere, Autodesk Maya, Autodesk 3D Studio Max. For realization of such a functional, combined into one application of the editor are the scene compiler, sound processor and rendering services.

Description of the System Operation Algorithm

1. Before the Web-service begins on processing the request, it returns its own load volume to the initiator (application) with the help of advanced calling of a separate method. If the load is too large, the initiator addresses another copy of the Web-service. Having found the least loaded copy of the Web-service, the initiator transfers to it a text fragment, which is to be animated. The load distribution mechanism is not principal for this algorithm: there is possible a sequential transfer of requests to accessible Web-services and if one Web-service is accessible, only, the load distribution is absent at all. Acting as a Web-service client may be absolutely any statement that is capable of fetching the Web-service methods both directly and through an agent (e.g., if the user initiates the transfer of request from the browser thin client and Web-service).

2. The Web-service, having received the request, assigns to it its number (RequestId), initiates its processing while controlling several statuses of this request until a ready video clip is received and which may be then transferred to the initiator. For the purpose, the text is first of all transferred to the semantic breakdown service. This is done not directly, but through a special load distributor (balancing component or router that routes call requests to be processed by free copies of the semantic breakdown services. The router keeps the information on the statuses of all received requests in a special table. The Web-service and router can interact according to the TCP/IP/HTTP/SOAP/protocol and so on.

3. The router sets the initial state (STATE1) for the request arrived with the identification code (RequestId).

4. The semantic breakdown service processes a text fragment (inside it or redirecting it to the semantic breakdown extraneous component) and receives the semantic breakdown results, e.g., in the XML format. For instance, in case of using the ABBYY Compreno technology, an access to the semantic breakdown results is performed by addressing the ABBYY Compreno Server through the aid of submitted COM API. The semantic breakdown service returns the breakdown results to the router interacting with it according to the TCP/IP protocol.

5. After receiving the semantic breakdown results, the router renews the request status with this identification code on STATE2 and returns the information on the request status to the Web-service. The Web-service renews the request status in the table of requests. This is necessary in one example of realization during which the Web-service transmits the request status to a client.

6. Thereafter, the semantic breakdown results are transferred to the least loaded scene compiler service. There may be several number of such services (load balancing is the same as for the semantic breakdown service) and they interact with the router according to the TCP/IP protocol.

7. First, the scene compiler service processes the semantic breakdown results (DataImporter), changing over from classification of notions submitted by the semantic breakdown means to the internal classification of objects, subjects, practices, properties, and to selection of rather specific models and list of objects, subjects and practices. For the purpose, use is made of the information on compliance of the semantic breakdown classes with the internal classes and the information on accessible models in the deposit of accessories. Both pieces of information are stored in a special meta database accessible for the scene compiler service. In this technical solution, use may be made of any database manager, both object and relational database manager: for example, the MongoDB object database.

8. Thereafter, a special scene object is filled with the data with reference to the received data. The scene object is then subjected to changes (change of the object state. Special managers sequentially operate with the scene object, which intelligently process various parameters necessary for building up the scene and introduce respective changes into the scene object.

9. The location selection manager selects the most suitable location from the content repository. The location is essentially a set of models creating a scenery (conformation) or a room (interior scene). Proceeding from the information on the available items located onstage, missing items or their equivalent substitutes, from the point of view of classification of objects, are added to the location over the text.

10. The arrangement manager sets the initial arrangement of objects (including scene characters). The objects are placed with due regard for the initial information on mutual arrangement as well as for the anchors by default. Each location contains a set of predefined points for arrangement of objects of certain overall dimensions.

11. Practice manager adds an execution sequence for each scene entry.

12. The scene entries are classified according to the system internal classes. Corresponding to each class is the so-called object controller (character controller, animal controller, transport controller, camera controller and so on). The scene entry controllers sequentially log the scene changes (relocations, animations, change of objects properties) depending on the execution sequence of the scene entries. For example, if there is a practice to "go to a wall" for character "Vasiliy" of the character class, then the character controller will move the character from the current point to the wall nearest point for a certain period of time (it is calculated proceeding from a character displacement speed) and in the process, it will play through the displacement animation during the entire period of displacement.

13. All the controllers log a sequence of scene changes into the JSON-format (text format).

14. The scene logged in the JSON-format is transferred back to the router, which renews this request status on STATE3 and transmits this information to the Web-service. Thereafter, the router, while distributing the load, selects the sound processor service and transmits to it the logged scene. The TCP/IP protocol is used for operation with the sound processor service. The logged scene contains the information on the dialogs of characters for which it is necessary to generate a sound. The sound is generated for the dialogs and the respective markers are entered into the scene JSON-description. The scene description and generated sound fragments for dialogs are returned to the router.

15. The router renews the request status on STATE4 transferring this information to the Web-service having selected a free rendering service. The scene JSON-description obtained from the sound processor service is transferred to the rendering service according to the TCP/IP protocol. The rendering service addresses the file repository with accessories and receives from it the files of models, sounds and textures to which the scene description is referred. With the help of the renderer scroll box, e.g., OGRE, the rendering service produces a video file and audio track of the same duration as of the mixed sounds corresponding to the practices as well. as of the background music and dialogs. Further on, the video file and audio track are combined compacted with the use of the coder/decoder, e.g., H264.

16. After producing the video file, the rendering service sends the router a message stating that the video file was successfully produced (the router deletes the executed request) and transfers a ready file with a video clip to the Web-service.

17. The Web-service having received the video clip file from the rendering service, transfers it to the user after saving it on the hard disk for further operations (the file is called by the respective request number). After successful transmission of the file to the initiator, the request is deleted from the table of requests of the Web-service. Thereat, the Web-service maintains a possibility of transmitting the saved files on request.

The claimed method and system may be modified and supplemented in such a manner that there could be:

- a possibility of simultaneous producing of video clips by several users according to different scenarios;
- a possibility of manual editing of a three-dimensional scene with the purpose of increasing its authenticity and obtaining of video clip/set of pictures of better quality;
- a possibility of manual editing of automatic semantic breakdown results with the purpose of obtaining a more faithful three-dimensional scene;
- a possibility of conducting a semantic breakdown manually with the purpose of obtaining a three-dimensional scene, i.e., so that a manual editing of a three-dimensional scene would support setting and correction of parameters of additional light sources, path definition and assignment of motion fundamental algorithms/cameras alignment, correction of a scene conjunction to a timeline, change of properties of the objects, models, textures, superimposition of the necessary sound tracks, introduction of changes into a scene associated with skeletal and facial animation of characters, assignment of poses, motion of characters, correction of execution sequence occurring in a scene;
- a possibility of replenishment of the library of accessories by own content (models, textures, sounds and so on) of the users so that the library of accessories used for building up a three-dimensional scene would be a replenishable one, which would makes it possible to use for visualization the quality models developed by the users earlier; and
- a possibility of writing of own arbitrary applications using this technology with the help of open interface.

EXAMPLES OF USE OF THE INVENTION

This invention realizes the FilmLanguage technology. The FilmLanguage text visualization technology may be used for:

- Development of the frontware (i.e., software containing the GUI interface), which makes it possible to computerize the process of composing the previews and visualization of scenarios;
- Development of games (both casual and others);
- Development of various services, including Web-services that make the production of user's content easier;
- Development of entertainment applications producing the animation video clips according to the text description; and
- Development of education applications.

The presented FIGURE of drawing illustrates the architecture, functionality and operation of possible realizations of the systems and methods according to various variants of implementation of this invention. In this connection, each unit may represent a module, segment or a part of code that contains one or several current instructions for realization of a certain logic function (functions). It should be also pointed out that in some alternative realizations, the functions specified in the unit may be carried out in the order different from that specified on the drawings. For example, two units shown in a successive order may be actually executed in the reverse order depending on the enabled functionality. It should be also pointed out that each illustrated unit and combinations of units on the drawing may be realized through specialized hardware-based systems and modules, which execute specialized functions or practices or through combinations of specialized hardware and computer instructions.

Terminology used here is intended for description of specific variants of invention implementation and is not intended for limitation of this invention by a given specific example. Singular forms used here are intended for comprising plural forms as well unless otherwise clearly specified by context. It will be clear that such terms as "contains" and/or "containing", "includes" and/or "including" and the like, when used in this description, determine the presence of certain properties, units, stages, operations, elements and/or components, but they do not eliminate availability or adding of one or several other properties, units, stages, operations, elements, components and/or their groups.

Although illustrated and described above are specific variants of the invention implementation, it should be clear for the experts in this field of art that presented instead of shown here specific variants of the invention implementation may be any configuration, which is intended for achieving the same goal and that the invention has some other applications in other media. The present claim is intended for covering any accommodations or variations of this invention. The following formula of invention is by no means intended for limitation of the scope of invention by specific variants of its implementation described here.

The invention claimed is:

1. A method of text visualization comprising the steps of:
    providing a natural language text fragment comprising a number of sentences;
    conducting a semantic analysis of the text fragment to produce a structured semantic net thereof with a text fragment action sequence;
    processing the structured semantic net of the text fragment to generate an initial three-dimensional scene in accordance with the text fragment action sequence;
    processing the structured semantic net of the text fragment to generate other three-dimensional scenes according to the text fragment action sequence;
    compiling the generated three-dimensional scenes into a video clip or a set of pictures; and
    visualizing the video clip or set of pictures.

2. The method according to claim 1, wherein the text fragment includes a scenario.

3. The method according to claim 1, further comprising adding a synchronous accompanying sound when producing a video clip.

4. The method according to claim 1, wherein said conducting a semantic analysis of the whole text fragment comprises the substeps of:
    splitting the text fragment into sentences;
    numbering words within a sentence;
    selecting objects, subjects, actions, and properties in the sentences;
    grouping all the words with the help of a notion tree to reduce synonyms to general notions to unambiguously identify objects within the whole text fragment.

5. The method according to claim 1, further comprising editing the generated three-dimensional scene manually by a user.

6. The method according to claim 1, wherein the semantic analysis is performed automatically.

7. The method according to claim 6, further comprising editing the results of the automatic semantic analysis manually by a user.

8. The method according to claim 1, wherein the semantic analysis is performed manually by a user.

9. A system of transforming a text into animation comprising:
- at least one Web-service processing a user request to visualize a natural language text fragment (NLTF);
- a semantic analysis service breaking down the NLTF to produce a structured semantic net therefrom;
- a meta database;
- a scene compiler service creating finished three-dimensional scenes from the structured semantic net and the meta database;
- a rendering service generating a video clip or a set of pictures from an aggregation of the three-dimensional scenes; and
- a user's apparatus to visualize the video clip or the set of pictures wherein the at least one Web-service is adapted to take into consideration statistics of the NLTF visualization requests, to accumulate data concerning frequency, time and resource indices calculated in the process of transforming text into animation, and to keep a log of its operation.

10. The system according to claim 9, wherein the text fragment includes a scenario.

11. The system according to claim 9, wherein the at least one Web-service is adapted to be authenticated by the user.

12. The system according to claim 9, wherein it comprises a plurality of Web-services located on at least one machine.

13. The system according to claim 9, further comprising a sound processor service to generate dialogs, sets of sounds produced during animation of a scene, and a background track.

14. The system according to claim 13, wherein the sound processor service is combined with the rendering service and the scenes compiler service.

15. The system according to claim 13, further comprising a component balancer to evaluate system component resources to thereby engage the components accordingly.

16. The system according to claim 15, wherein the component balancer controls sequential data processing by the semantic analysis service, the scene compiler service, the sound processor service, and the rendering service.

17. The system according to claim 9, wherein the rendering service is adapted to dub and compress the video clip.

* * * * *